United States Patent [19]

Nimura et al.

[11] Patent Number: 6,098,015
[45] Date of Patent: Aug. 1, 2000

[54] NAVIGATION SYSTEM FOR VEHICLES AND STORAGE MEDIUM

[75] Inventors: Mitsuhiro Nimura; Yasunobu Ito, both of Anjo, Japan

[73] Assignee: Aisin AW Co., Ltd., Japan

[21] Appl. No.: 08/764,011

[22] Filed: Dec. 11, 1996

[30] Foreign Application Priority Data

Apr. 23, 1996 [JP] Japan .................................. 8-101668
Apr. 23, 1996 [JP] Japan .................................. 8-101669
Apr. 23, 1996 [JP] Japan .................................. 8-101670

[51] Int. Cl.[7] ............................................. G06F 165/00
[52] U.S. Cl. ........................................ 701/209; 701/201
[58] Field of Search .................................. 701/201, 202, 701/207, 208, 209, 210; 340/998, 990, 995; 73/198 R

[56] References Cited

U.S. PATENT DOCUMENTS

| | | | |
|---|---|---|---|
| 4,926,336 | 5/1990 | Yamada | 364/444 |
| 5,031,104 | 7/1991 | Ikeda et al. | 364/449 |
| 5,036,471 | 7/1991 | Tamura et al. | 364/449 |
| 5,103,400 | 4/1992 | Yamada et al. | 364/444 |
| 5,184,303 | 2/1993 | Link | 364/449 |
| 5,220,507 | 6/1993 | Kirson | 364/444 |
| 5,406,490 | 4/1995 | Braegas | 364/449 |
| 5,614,895 | 3/1997 | Ohomori et al. | 340/995 |
| 5,712,632 | 1/1998 | Nishimura et al. | 340/995 |
| 5,752,217 | 5/1998 | Ishizaki et al. | 701/201 |

FOREIGN PATENT DOCUMENTS 0724135  7/1996  European Pat. Off. ........ G01C 12/20

*Primary Examiner*—William A. Cuchlinski, Jr.
*Assistant Examiner*—Arthur D. Donnelly
*Attorney, Agent, or Firm*—Lorusso & Loud

[57] ABSTRACT

In a navigation system, user preferred road data is determined and stored during travel to supplement fixed road data such as map data, intersection data, node data, and destination data stored in CD-ROM for subsequent use in providing route guidance in accordance with user road preferences. The user preferred road data is the data of actual trips, and the preference of the user is reflected in the user preferred road data. To determine user preferences, either the user preferred road data is compared to the fixed road data or a searched route calculated from the user preferred road data and CD-ROM data is compared with the searched route calculated from CD-ROM data. By using the determined user preferences in route searching, it is possible to provide more elaborate route searching and route guidance in accordance with the preference of the user.

18 Claims, 21 Drawing Sheets

FIG. 2(A)
Guidance road data

| Number of roads (n) | | |
|---|---|---|
| 1 | Road number | |
| | Length | |
| | Road attribute data | |
| | Address and size of shape data | |
| | Address and size of guidance data | |
| | ⋮ | |
| n | | |

FIG. 2(B)
Shape data

| | Number of nodes (m) |
|---|---|
| 1 | Eastern longitude |
| | Northern latitude |
| | ⋮ |
| m | |

FIG. 2(C)
Guidance data

| Intersection name |
|---|
| Precaution data |
| Road name data |
| Address and size of road name voice data |
| Address and size of destination data |

FIG. 2(D)
Destination data

| Number of destinations (k) | |
|---|---|
| 1 | Destination road number |
| | Destination name |
| | Address and size of destination name voice data |
| | Destination direction data |
| | Driving guidance data |
| | ⋮ |
| k | |

FIG. 2(E)
Destination direction data

−1 : Invalid
0 : Not necessary
1 : Straight ahead
2 : Rightward direction
3 : Diagonally rightward direction
4 : Direction to return to right
5 : Leftward direction
6 : Diagonally leftward direction
7 : Direction to return to left

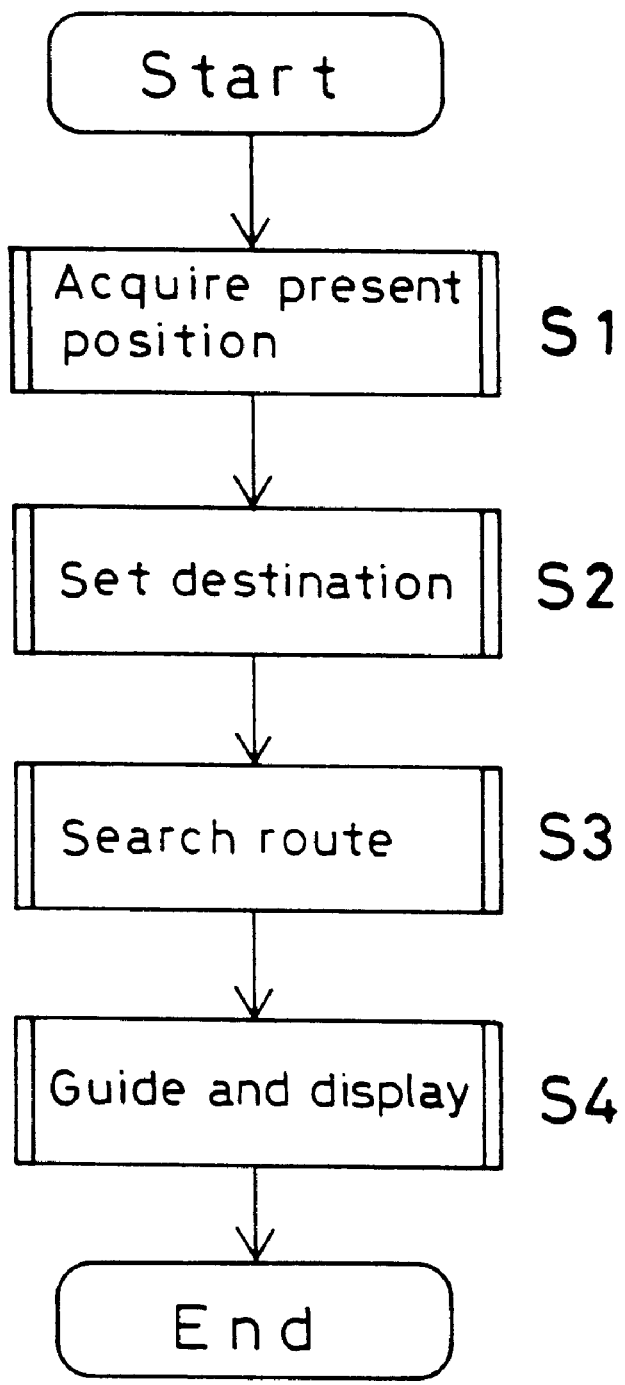

FIG. 4

Node data

| | Number of nodes (nn) |
|---|---|
| 1 | Eastern longitude |
| | Northern latitude |
| | Intersection number |
| ↓ | |
| nn | |

FIG. 5

Link data

| | Number of links (nl) |
|---|---|
| 1 | Node number of start point |
| | Node number of end point |
| | No. of drivings in direction of start point→end point |
| | No. of drivings in direction of end point→start point |
| | No. of registrations by user operation |
| | Length of link |
| | Average vehicle speed |
| | Data on date and time of driving |
| | Road identification |
| | Road number in map data |
| | Starting position on road in map data |
| | End position on road in map data |
| ↓ | |
| nl | |

FIG. 6
Intersection data
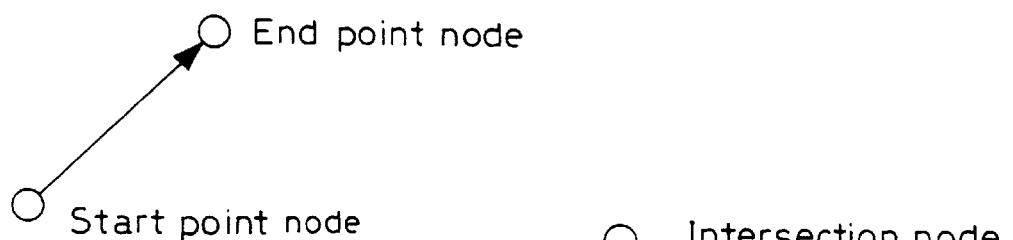
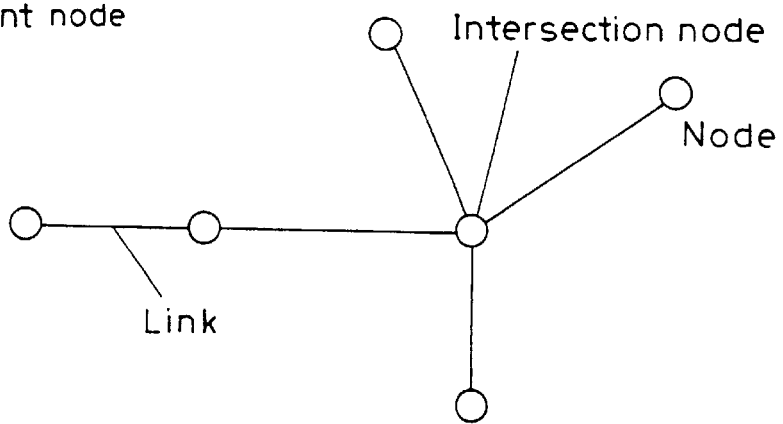
FIG. 7(a)
FIG. 7(b)

R : Route searched from CD-ROM data
R' : Route searched from locus data

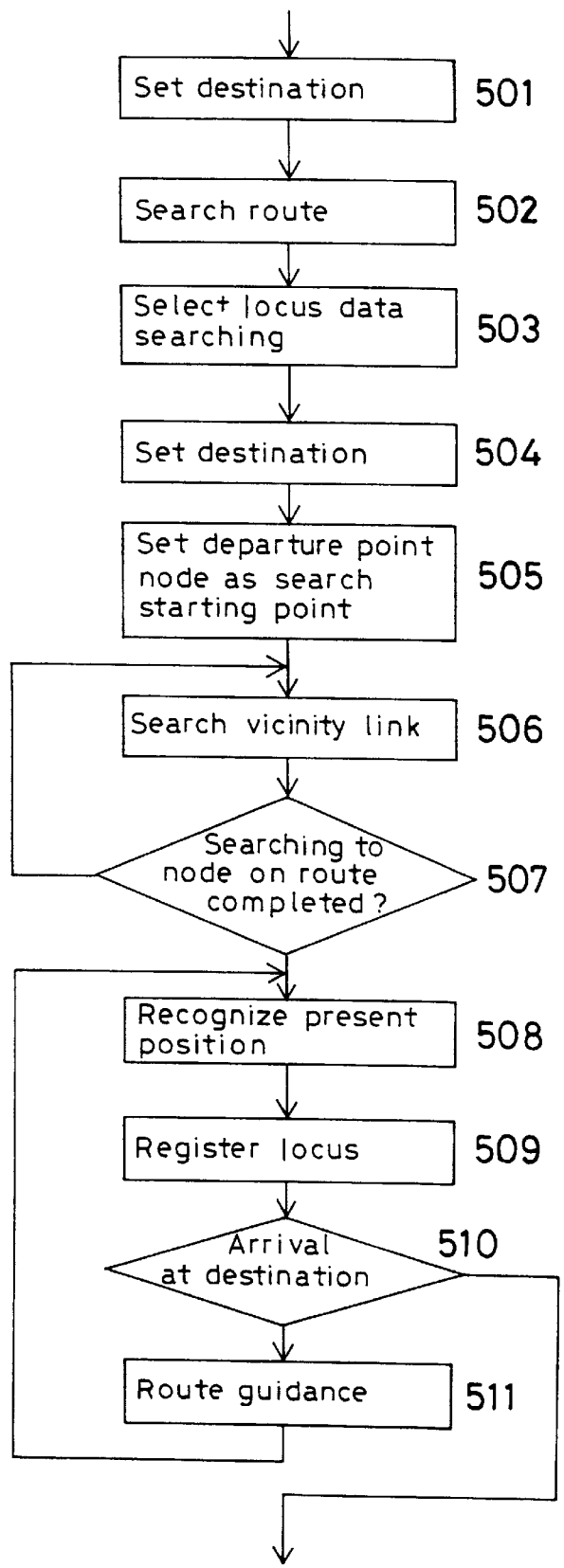

FIG. 21
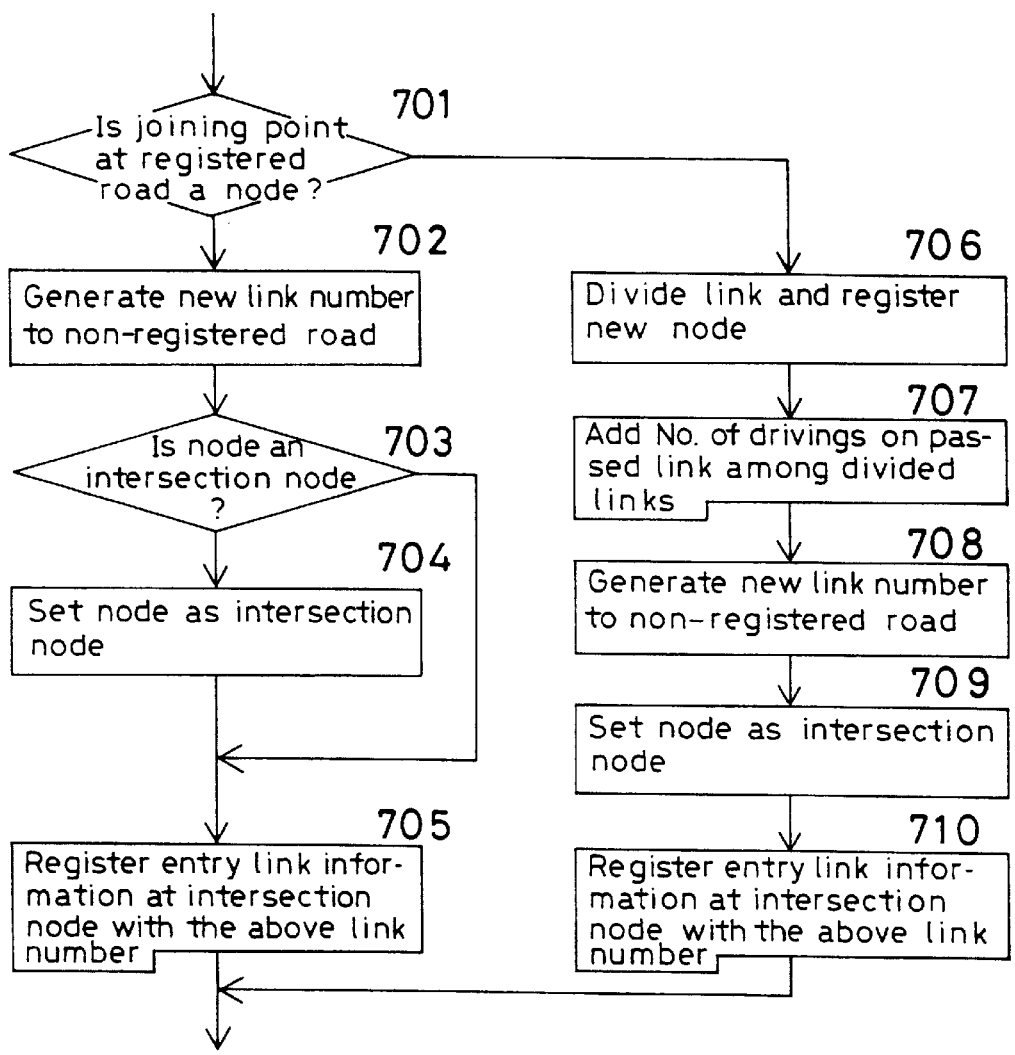
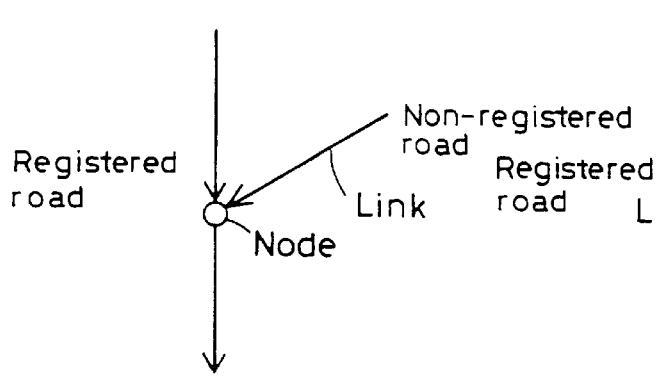
FIG.22 (a)
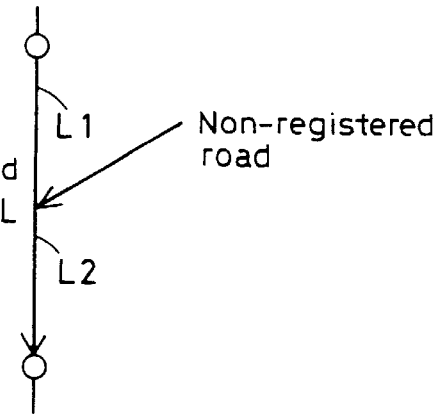
FIG.22 (b)

NAVIGATION SYSTEM FOR VEHICLES AND STORAGE MEDIUM

BACKGROUND OF THE INVENTION

The present invention relates to a navigation system for a vehicle having stored route or road data which, in response to entry of a destination, is searched to determine an optimum route of travel and to provide guidance information to a driver of the vehicle as the vehicle travels along the optimum route.

Various types of navigation systems have been proposed in the prior art to enable smooth driving of a vehicle along a route unfamiliar to the driver. In response to input of a destination, guidance for travel along an optimum route is provided during travel along the route. Such prior art systems have fixed road data, such as intersection data, node data, map data, etc., stored in a CD-ROM which is searched to determine the shortest route from the present position to the destination. The driver is often given the opportunity to modify the determined route by selecting an alternative road from a displayed map. The searched route is displayed on a screen and voice directions may be given to provide guidance.

In these conventional route guidance systems, the road data recorded in the CD-ROM is generally limited to main roads such as roads having a minimum width. Minor roads or roads which are narrower than the minimum width are not included and thus not available for searching and route guidance.

Additionally, there may be an alternative road preferred by a driver because of familiarity, favorable traffic conditions or other reasons. This alternative road has road data in the CD-ROM but is not selected by the guidance system search because of system search preferences. Modifying the searched route to substitute this alternative road in the guidance route requires additional effort by the driver and additional delay because of the need to re-search at least a portion of the route.

It is an object of the present invention to enable user addition of road data of roads not included within the recorded fixed road data.

It is another object of the present invention to provide system searching which takes into account user road preferences.

SUMMARY OF INVENTION

The invention is summarized in a vehicle navigation system wherein user preferred road data is recorded and used in subsequent system searches along with fixed or preset system road data to determine a route of travel. In one embodiment, the user preferred data is compared to the fixed system data to determine user preferences which are then used in determining a route of travel in accordance with the user preferences. In another embodiment, first and second routes are calculated from the respective user preferred data and fixed system data and the first and second routes are compared to determine user preferences which are then used in determining a route of travel in accordance with the user preferences.

User preference road data, such as nodes, links and intersections, are recorded during travel by user's vehicle. This user preference data is then available for subsequent use in determining a route in accordance with the user's preferences.

BRIEF DESCRIPTION OF DRAWINGS

FIG. 2 is a diagram of an arrangement of files of fixed road data stored in a CD-ROM of FIG. 1.

FIG. 3 is a flow chart of a route searching and guidance program for the system of FIG. 1.

FIG. 4 is a diagram of an arrangement of user preferred node data used in the system of FIG. 1.

FIG. 5 is a diagram of an arrangement of user preferred link data used in the system of FIG. 1.

FIG. 6 is a diagram of an arrangement of user preferred intersection data used in the system of FIG. 1.

FIGS. 7(a) and 7(b) are maps illustrating examples of road nodes, links and intersection nodes represented by node data, link data and intersection data of FIGS. 4–6.

FIG. 16 is a flow chart of still another procedure for route searching and guidance utilizing user preferred road data.

FIG. 21 is a flow chart of a procedure for registering user preferred data when a vehicle enters a registered road from a non-registered road.

FIGS. 22(a) and 22(b) are maps of routes illustrating registration of user preferred data in accordance with the procedure of FIG. 21.

DESCRIPTION OF THE PREFERRED EMBODIMENTS

Figure 1:
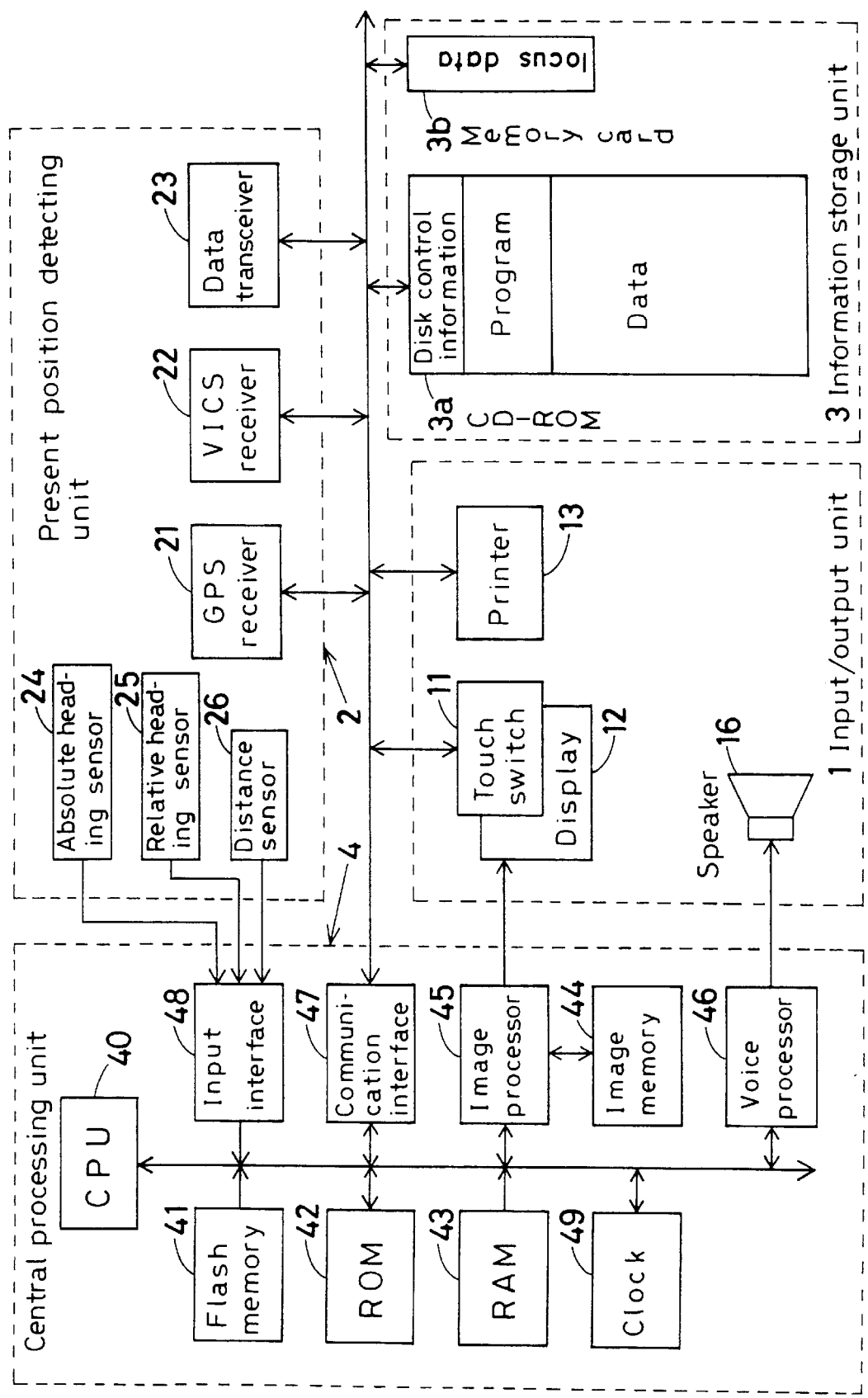
FIG. 1 is a block diagram of a navigation system in accordance with the present invention.

As shown in FIG. 1, one embodiment of a navigation system for a vehicle in accordance with the invention includes an input/output unit 1 for inputting and outputting information relating to route guidance; a present position detecting unit 2 for detecting information relating to the present position of the vehicle; an information storage unit 3 for containing and recording navigation data including user preferred road data or locus road data (i.e., road data based on detected position or locus and recorded while traveling) necessary for determining a route in accordance with user preferences along with display and voice guidance data necessary for route guidance; and a central processing unit 4 for performing route search processing and for processing display/voice guidance data necessary for route guidance and for controlling the entire system.

The input/output unit 1 enables the driver to instruct the central processing unit 4 to perform navigation processing and control output of guidance information by voice and/or on screen by the unit 1 and to print out data after the processing. A touch screen 11 is included in the input/output unit 1 so that the driver can input a destination such as by inputting a telephone number or map coordinates, or by other conventional technique. Alternative input devices such as a remote controller, etc., may be used. A display 12 displays input data on screen or displays route guidance information on screen automatically in response to a request by the driver. A printer 13 prints out data processed by the central processing unit 4 or data stored in the information storage unit 3. A speaker 16 outputs route guidance information in voice.

A voice decoder or recognition circuit (not shown) can be added to enable voice input of information and instructions. Additionally, the input/output unit can include a reader (not shown) for an information source such as a note type electronic unit containing data such as map data, destination data, etc., specific to the driver.

The display 12 comprises a color cathode ray tube (CRT) or a color liquid crystal device (LCD) for displaying all screens necessary for navigation such as route setting screens, sector view screens, intersection view screens, etc., based on map data and guidance data retrieved and/or processed by the central processing unit 4; and for displaying buttons for driver entry of route data such as the destination or for driver selection of menu options such as initiating guidance or changing screens or menus. The touch screen 11 contains a transparent two-dimensional array of switches (not shown), two-dimensional resistance panel (not shown), or other two-dimensional touch sensitive which can be monitored in correspondence to displayed buttons or driver selectable items to enable the driver input. Additionally, transit intersection information such as intersection names are displayed in pop-up color on the sector view screen when necessary. The display 12 is mounted on the vehicle instrument panel near the driver's seat so that the driver can confirm the present position of the vehicle by looking at the sector view screen and can obtain information on the route ahead.

The present position detecting unit 2 includes a global positioning system (GPS) receiver 21, a VICS receiver 22, a data transceiver 23, an absolute heading sensor 24, a relative heading sensor 25 and a distance sensor 26. The GPS receiver 21 obtains GPS satellite information to determine the vehicle position. The VICS information receiver 22 obtains information by utilizing FM multiplex broadcasting, radio beacon, optical beacon, etc. The data transceiver 23 performs two-way communication to and from an information center (such as ATIS) or other vehicles by utilizing portable telephone, personal computer, etc. The absolute heading sensor 24 detects the forward direction of movement of the vehicle by utilizing geomagnetism, for example.

The relative heading sensor 25 detects changes in the forward direction of movement by utilizing a steering sensor or a gyro sensor, for example. The distance sensor 26 detects the distance traveled by the vehicle such as by detecting the number of wheel revolutions, for example. By utilizing information from one or more of the receivers 21, 22 and 23 and sensors 24, 25 and 26, the central processing unit 4 can determine the present position of the vehicle, transmit and receive road information and traffic information, i.e., update information relating to road conditions, and transmit and receive information relating to present position.

The information storage unit 3 is an external storage unit for storing programs and data for navigation. The unit 3 comprises, for example, a CD-ROM 3a and a memory card 3b. In the CD-ROM 3a, various programs are stored, including a program for executing procedures such as route searching, a program for executing searching based on user preferred data or searching based on user preferences such as shown in the flow charts of the present embodiments, a program for performing display output control necessary for route guidance and voice output control necessary for voice guidance. The CD-ROM also contains data necessary for the programs and display information data necessary for route guidance and map display. These data include files of data such as map data, searching data, guidance data, map matching data, destination data, registered point data, road data, data for each category, landmark data, etc. All necessary data for the navigation system are stored in the CD-ROM 3a. The memory card 3b is used to store user preferred node, road and intersection data (user preferred data, also referred to as locus data) during each navigated road trip by the vehicle so that user preferred data can be used in subsequent route searches. Alternatively, the CD-ROM contains only navigation and guidance data and the programs are stored in ROM in the central processing unit 4.

The central processing unit 4 includes a CPU 40, a flash memory 41, ROM 42, RAM 43, image memory 44, image processor 45, voice processor 46, communication interface 47, input interface 48 and clock 49. The CPU 40 controls the overall operation of the navigation system and executes the various programs and procedures used in the system. The flash memory 41 receives and stores the programs and procedures from the CD-ROM 3a. The ROM 42 contains initialization programs including programs for initially reading and comparing CD-ROM program information with program information in the flash memory and updating the flash memory when necessary. RAM 43 is used for temporarily storing searched route guidance information such as point coordinates of the destination, road name code number, etc., and other computation data. Image memory 45 stores image data used for screen display, and the image processor 45 under control of the CPU 40 reads the image data from the image memory and generates the appropriate signals operating the display 12. The voice processor 46 synthesizes voice, phrase, comprehensive sentence and other sounds read from the information storage unit 3 based upon output control signals from the CPU 40 and generates analog signals output to the speaker 16. The communication interface 47 handles the data exchange or input/output of various units and devices of the navigation system. Outputs of the absolute heading sensor 24, relative heading sensor 25 and distance sensor 26 are handled by the input interface 46 under control of the CPU 40. The clock 49 maintains the date and time available for use by the CPU. Route guidance is normally provided by both screen display and voice output, but the driver can select whether the information should be given by voice or not.

Alternatively, the program for updating the current processing program in flash memory 41 may be located in an external storage medium such as the storage unit 3. The navigation programs may all be in the CD-ROM 3a or other external storage medium for reading into flash memory 41 or RAM 43 for execution, or a part or all of the navigation programs may be in ROM 42. Necessary data and any necessary external programs stored in external storage medium such as information storage unit 3 are read into the central processing unit 4 of the navigation system for processing and controlling navigation functions by the CPU 40.

The navigation system of FIG. 1 includes a flash memory 41 of relatively large capacity to receive and store programs from CD-ROM 3a of the external storage unit while the ROM 42 is relatively small and contains only the start-up or initialization programs. The flash memory 41 is non-volatile so that programs and information are maintained even when power is interrupted or turned off. In the start-up program of ROM 42, the program stored in the flash memory 41 is checked, and the disk control information of CD-ROM 3a is read. Based upon a comparison of the disk control information from CD-ROM 3a and the program information in flash memory 41, the programs in CD-ROM 3a are loaded for updating the programs in the flash memory 41.

FIG. 2 shows an example of an arrangement of major fixed data files stored in CD-ROM 3a. Guidance road data file A includes data necessary for calculating a route by the route calculating procedures and for providing route guidance. For each of "n" (quantity) roads, the data file A includes a road number, a road length, road attribute data, address and size of shape data, and address and size of guidance data. A road number is set for each direction (outward and return) for each road between branch points. The shape data B contains coordinate data of eastern (or western) longitude and northern (or southern) latitude for each node separated by several meters from adjacent nodes on each road. Guidance data C includes intersection (or branch point) name, precaution data, road name data, address and size of road name voice data, and address and size of destination data. Destination data D includes the number of destinations (k) and, for each of the destinations, a destination road number, destination name, address and size of destination name voice data, destination direction data and driving guidance data. The destination name also contains a direction name. The destination direction data is one of the possible data E such as invalid (destination direction data not used), not necessary (no guidance provided), straight ahead, right, diagonally right, direction to return to right, left, diagonally left, and direction to return to left.

Referring to FIG. 3, a basic overall program for performing vehicle navigation is started by the CPU 40 in the central processing unit 4 by reading the present vehicle position (step S1) as detected by the present position detecting unit 2. Also in step S1, the data stored in the information storage unit 3 concerning the vicinity around the present position is read, and a map of this vicinity is displayed along with the name and other data of the present position Then in step S2, the destination is set such as by the driver entering a place name, facility name, telephone number, address, registered point, coordinates, etc. A route from the present position to the destination is then searched in step S3. When the route is determined, route guidance in step S4 is performed until the vehicle reaches the destination. During route guidance, the present position of the vehicle as detected by the present position detection unit 2 is repeatedly read and used to update the display.

In the present invention, user preferred navigation data such as user preferred node data, user preferred link data and user preferred intersection data illustrated in FIGS. 4, 5 and 6, respectively, are stored in the memory card 3b of the information storage unit 3. This user preferred data can be used when a route is searched to determine a route reflecting user preferences.

As shown in FIG. 4, an example of an arrangement of user preferred node data includes the number of nodes (nn), and for each node, coordinates of eastern (or western) longitude and northern (or southern) latitude and an intersection number identifying the node as an intersection or not. For example, a node without a branch is identified with an intersection number of "0" and a node having a branch is identified with an intersection number of "1" to indicate that the node is an intersection.

An example arrangement of link data, FIG. 5, includes the number of links (nl). For each link, the data includes a starting point node number, an end point node number, number of trips from the start point to the end point, number of trips from the end point to the start point, number of registrations by user, length of link, average vehicle speed, data on the date and time of driving, road identification, road number in map data, starting position on road in map data, and end position on road in map data. The starting point node number and end point node number are those associated with the node data of FIG. 4 and indicate direction. FIG. 7(a) shows the relationship of a link and its starting and end point nodes. The number of trips is the total number of times that the link has been driven in the corresponding direction from the start point node to the end point node and from the end point node to the start point node; the numbers of trips of corresponding links are updated during each time the vehicle is driven. The number of registrations by user is the number of times the user specifies to register the link and is used for calculation of search preferences along with other possible uses. The length of the link is the distance between the start and end nodes. The average vehicle speed is in speed per hour determined from calculated cumulation of speed per hour and the recorded number of trips. Data of the driving date and time can be of the last trip or can be a history of recent trips. The road identification indicates when the link is part of a road stored in CD-ROM 3a, and when so, is an identification number or symbol associated with fixed road data stored in CD-ROM 3a including both roads used for guidance and roads, generally narrow roads, not used for guidance. If the link is part of a road having map data stored in CD-ROM for guidance information, the road number in the CD-ROM map data, the starting position on the road in the map data, and the end position on the road in the map data are recorded in the link data of FIG. 5 so that searching and guidance can be conducted from the associated map data in CD-ROM. A link is generally shorter than the corresponding road stored in CD-ROM, and thus the starting position and end position indicate the location of the link on the road in the CD-ROM map data.

As illustrated in FIG. 6, an example of an arrangement of user preferred intersection data includes the number of recorded intersections (nc). For each of the recorded intersections, there is recorded the number of entry links (nin); for each entry link there are recorded the entry link number and the number of exit links (nout); and for each exit link there are recorded the exit link number, the number of advancements from the intersection into the exit link, the average transit time, and data of the date and time. The number of entry links is the number of links connected to the intersection and by which the intersection can be entered.

The number of exit links are the number of links which can be taken to leave the intersection after entering by the corresponding entry link. FIG. 7(b) shows an intersection node having four entry links (link 1, link 2, link 3, link 4); for entry link 1 there are three exit links (link 2, link 3, link 4); for entry link 2 there are three exit links (link 1, link 3, link 4); for entry link 3 there are three exit links (link 1, link 2, link 4); and for entry link 4 there are three exit links (link 1, link 2, link 3). The number of advancements from the intersection into the corresponding exit link is updated each time the intersection is traversed. The average transit time includes the average time required for waiting at any traffic signal and/or taking any left or right turn. The data of date and time is the date and time of the last transit, or alternatively, a history of recent transit dates and times.

Figure 8:
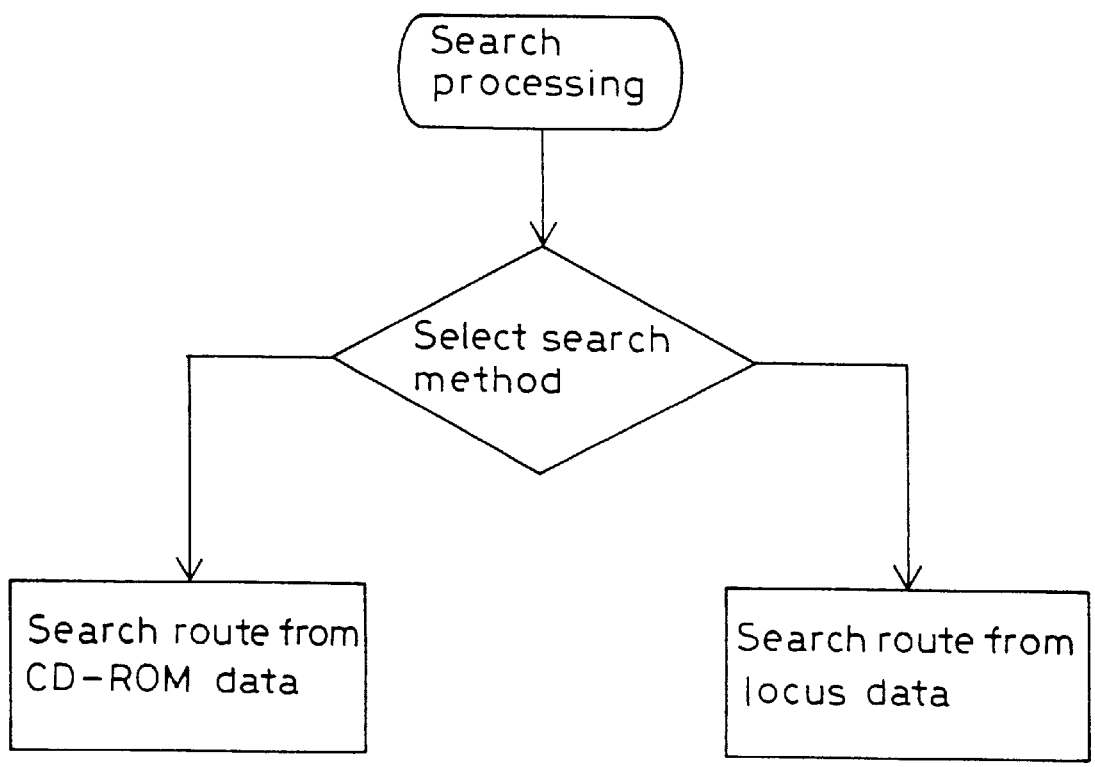
FIG. 8 is a flow chart of a selection method of search processing in the system of FIG. 1.

In the present invention, route searching is conducted utilizing CD-ROM data and user preferred data. In the procedure of FIG. 8, options presented on a menu screen enable selection of whether route searching should be conducted using fixed CD-ROM data or should be conducted using user preferred data.

Figure 9:
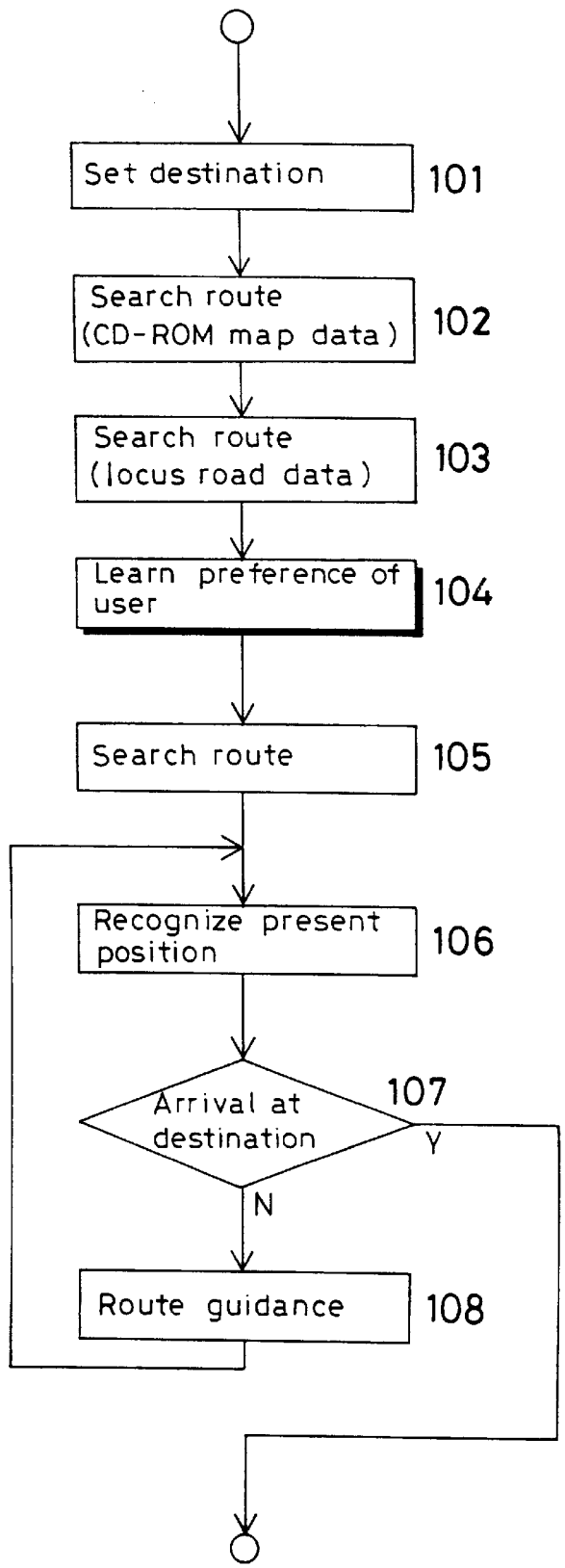
FIG. 9 is a flow chart of a procedure for search processing to determine a route favorable to the driver.
Figure 10:
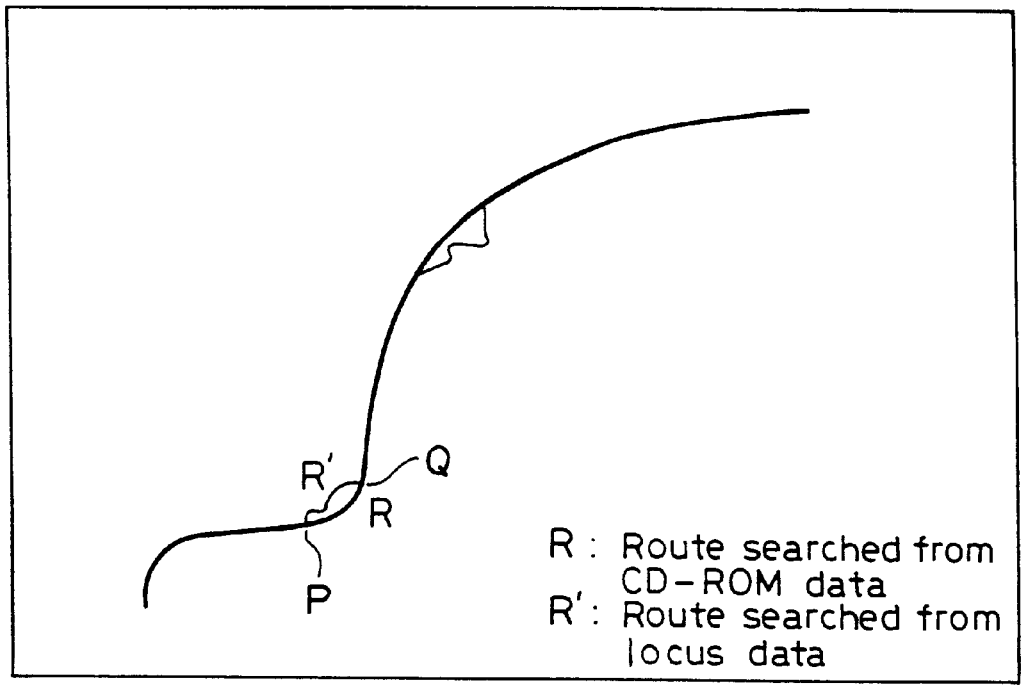
FIG. 10(a) is a map illustrating routes searched by the procedure of FIG. 9.
FIG. 10(b) is a enlargement of a portion of FIG. 10(a).
Figure 10:
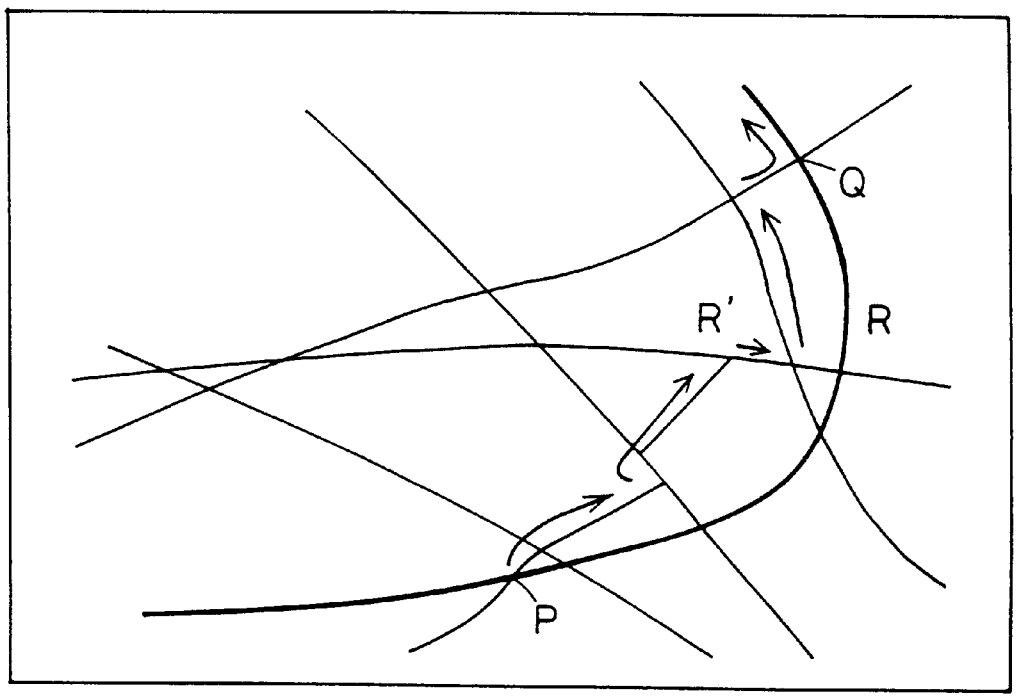

In FIG. 9, the route guidance program is started by CPU 40 after the destination is set in step 101. Next in step 102, CD-ROM data is read and route searching is carried out using the CD-ROM data. For example, the search in step 102 determines a route R (thick line) as shown in FIG. 10(a). Then in step 103, user preferred data is read from the memory card 3b and used in route searching to determine a route R' (thin line) which is partly different from the route R. Next, the route R is compared to the route R', and the preference of the user is learned from the difference between the two routes in step 104.

The user preferred data is an accumulation of data of driving practices of the user such as previous trips taken by the user, and its contents reflect the preferences of the user. On the other hand, the CD-ROM data is mechanically stored data, and the involvement of the user is limited only to the setting of the destination point when the route is determined using only CD-ROM data. The result of searching user preferred data reflects the preference of the user whereas the result of searching the fixed data of the CD-ROM reflects the preferences of the authors of the CD-ROM and not the preferences of the user. Therefore, it is possible to learn the preference of the user when the two determined routes are compared with each other.

Figure 11:
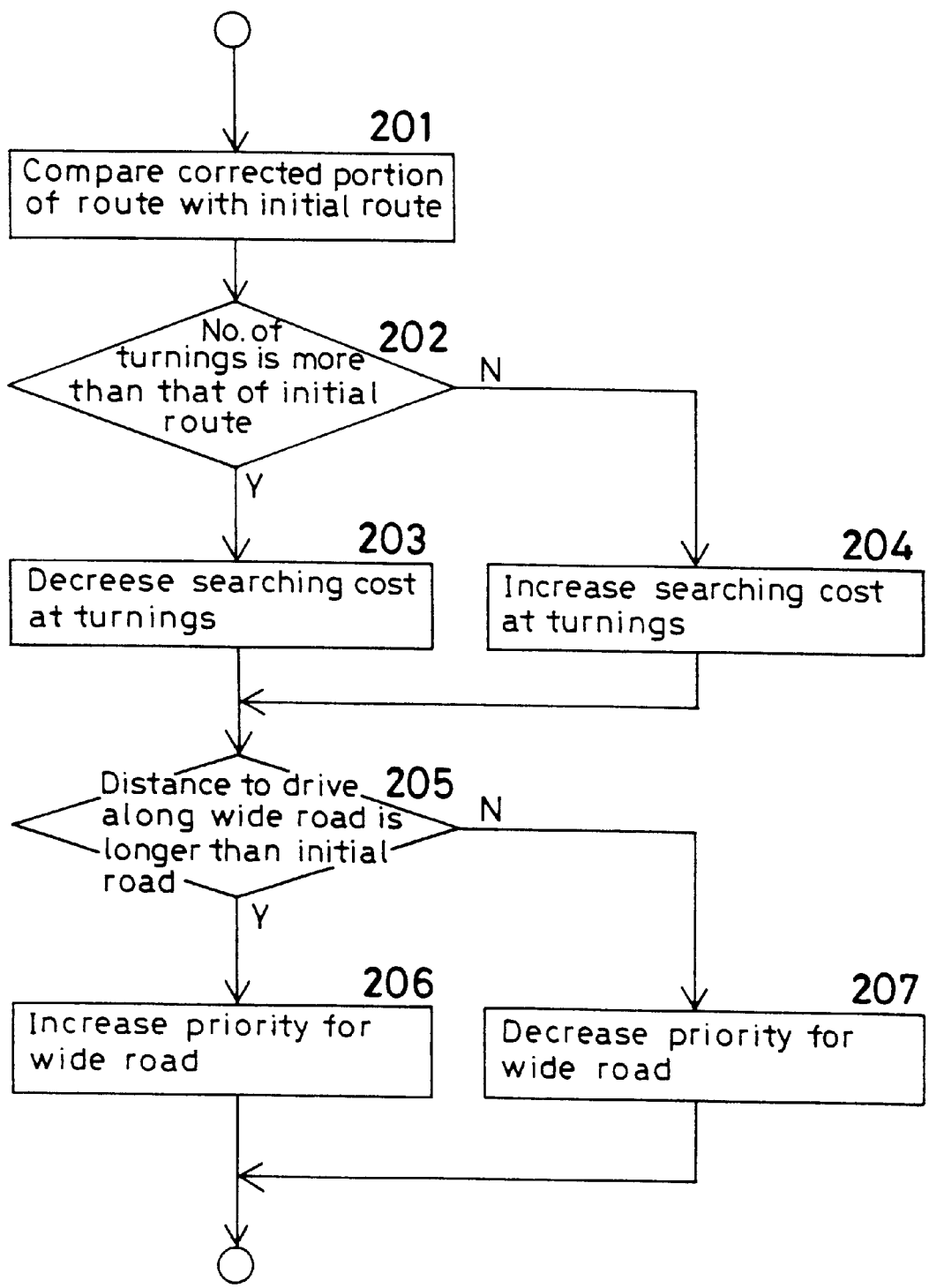
FIG. 11 is flow chart of a user preference learning procedure in the system of FIG. 1.
Figure 12A:
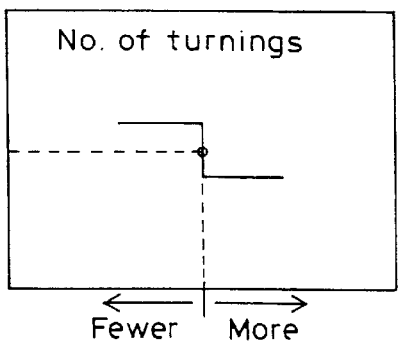
FIGS. 12(a)–(f) are graphs illustrating changes in preference coefficients for searching in the system of FIG. 1.

The flow chart of FIG. 11 illustrates a procedure to learn the user's preference. First in step 201, the modified portion of the route R', FIG. 10(a), determined using user preferred data is compared with the route R determined using only CD-ROM data. As shown in the enlarged view of FIG. 10(b) of a section between point P and point Q where the routes R and R' take different courses, the route R is a single road although it is curved, while the route R' contains several roads with several left and right turns as shown by the arrows. In step 202 the number of turns of route R' is compared with the number of turns of route R. In case the number of turns of route R' is greater, it means that the user does not worry about turns or perhaps prefers turns. As a result, a turn preference coefficient is decreased in step 203. If the number of turns in the route from the user preferred data were less, the turn preference coefficient would be increased in step 204. FIG. 12(a) shows the turn preference coefficient resulting from comparison of turns in the determined routes; for example, the turn preference coefficient is 1 in case the number of turns from user preferred (new) data is the same as the route from CD-ROM (initial) data, the turn preference coefficient is 0.8 in case the number of turns from user preferred data is the greater than the number of turns in the route from CD-ROM data, and the turn preference coefficient is 1.2 in case the number of turns from user preferred data is the less than the number of turns in the route from CD-ROM data.

Figure 12B:
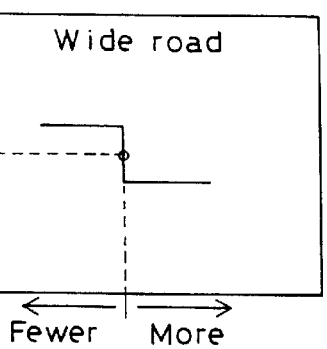

Next in step 205, the length of wide road, i.e., road having a minimum width, of the route R' is compared with length of wide road in the route R. If the length of wide road in the route determined from user preferred data is longer, the priority for minimum road width is increased in step 206. If the length of wide road in user preferred data is shorter the priority for minimum road width is decreased in step 207. FIG. 12(b) show the wide road preference coefficient resulting from comparison of the lengths of wide road in the determined routes. For example, the wide road preference coefficient is 0.8 if the length of wide road in the route determined from user preferred (new) data is shorter than the wide road in the route determined from CD-ROM (initial) data, and the wide road preference coefficient is 1.2 if the length of wide road in the user preferred data route is longer.

Figure 12C:
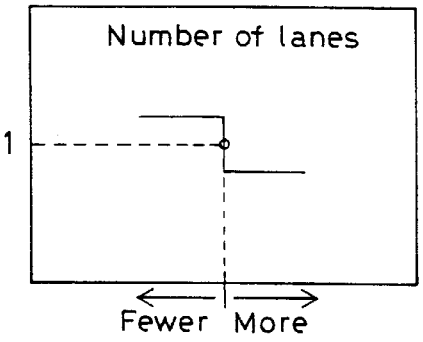
Figure 12D:
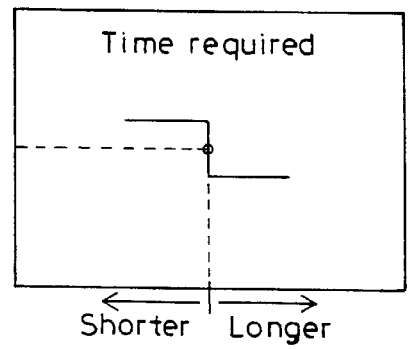
Figure 12E:
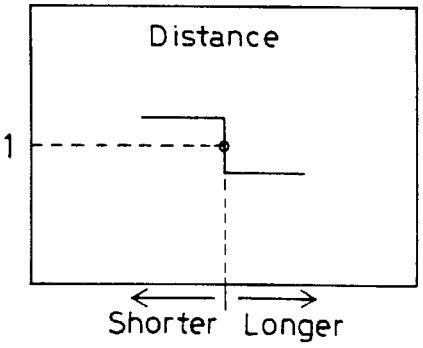
Figure 12F:
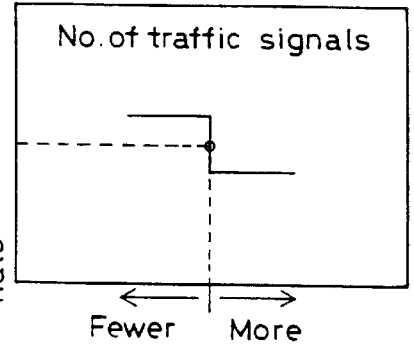

Comparisons of other road characteristics between routes R' and R can determine other preference coefficients such as a number of lanes preference coefficient (FIG. 12(c)), travel time preference coefficient (FIG. 12(d)), distance preference coefficient (FIG. 12(e)), and number of traffic signals preference coefficient (FIG. 12(f)). If comparisons indicate a difference, the corresponding coefficients are changed.

Returning to FIG. 9 after learning the preferences of the user in step 104, a route search is performed in step 105 of the fixed and user preferred data based upon the learned preferences to determine a guidance route. Then route guidance is then conducted in steps 106, 107 and 108 until the vehicle reaches the destination.

In the above description, the route searched from CD-ROM data is compared with the route searched from driving user preferred data, and the search user preferences are changed according to the results of the comparison. A user preferred route is then searched according to the changed user preferences. Alternatively, the search preferences of the user can be determined by comparison of the fixed road data in the CD-ROM with the user preferred road data in the memory card prior to or during route searching, and the result of the comparison can be reflected in a route searching procedure of the fixed road data from the CD-ROM and the user preferred road data from the memory card in accordance with the preferences of the user.

Figure 13:
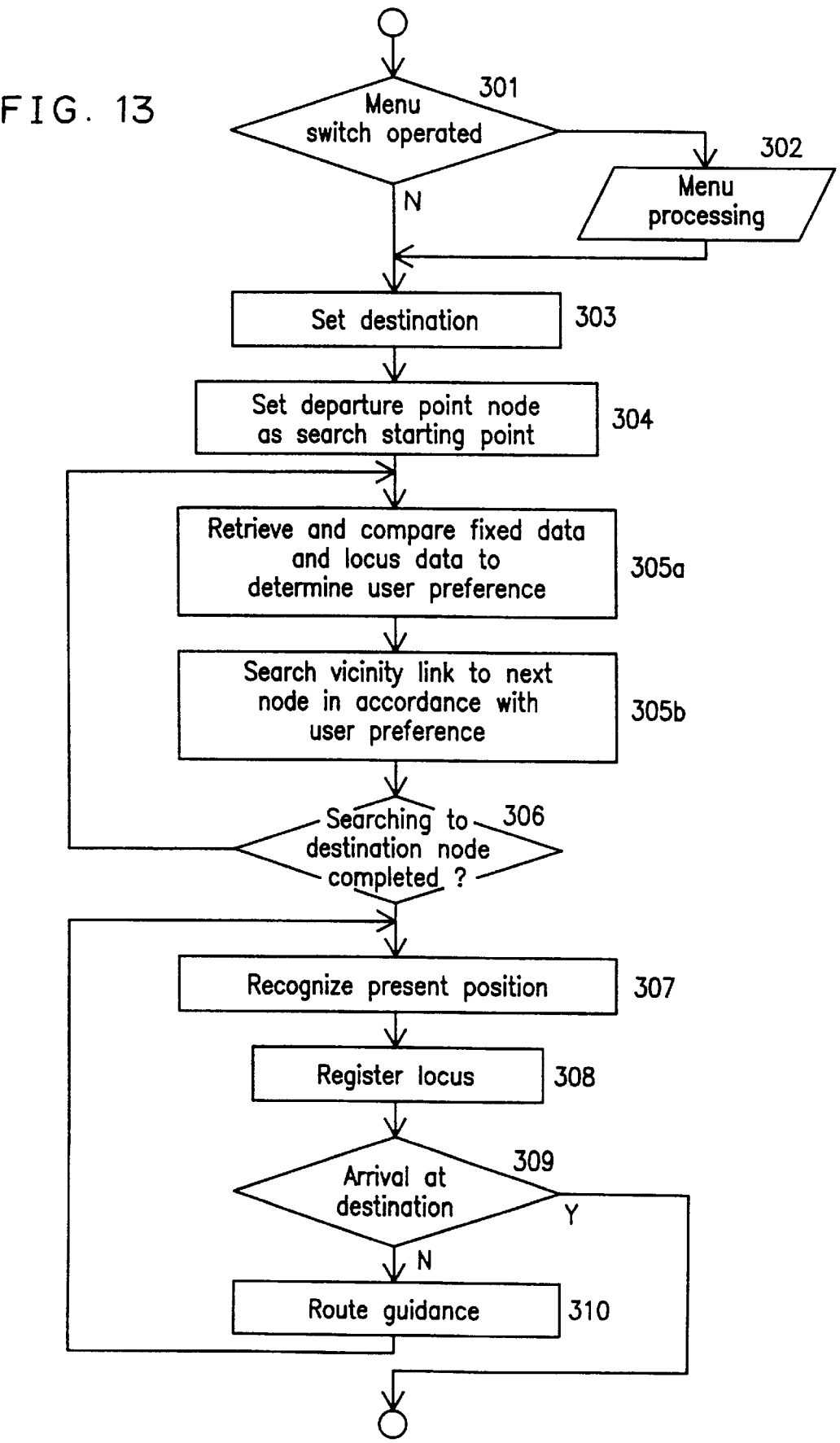
FIG. 13 is a flow chart of another procedure for route searching and guidance utilizing user preferred road data.

In a modified searching and guidance program of FIG. 13 using and producing user preferred data, the destination is set, step 303, directly from a menu screen or after user preferred preference has been set, steps 301 and 302, and the route searching and guidance program is performed by the CPU 40 of the central processing unit 4. The departure point is set as the search start point in step 304. The following steps 305a, 305b and 306 are the searching phase of the program. In step 305a fixed road data from the CD-ROM relating to the vicinity of the search point node and user preferred road data from the memory card relating to the vicinity of the search point node are retrieved and compared to determine a user preference. Searching of vicinity links from the current search point node to the next search point node from the fixed and user preferred data in accordance with the user preference determined in step 305a is conducted in step 305b to determine or calculate a guidance route of travel which is stored in RAM 43. Step 306 continues steps 305a and 305b until the current search point node becomes the destination. When the route searching is completed, the program enters the guidance phase wherein user preferred data is registered and guidance is provided to the driver by repeatedly cycling through steps 307, 308, 309 and 310 until the destination is reached. The present position is determined in step 307. Route user preferred data (nodes, links and intersections) are registered in step 308. Route guidance is provided by step 310 from the guidance route of travel in RAM 43 until step 309 finds that the destination has been reached.

Figure 14A:
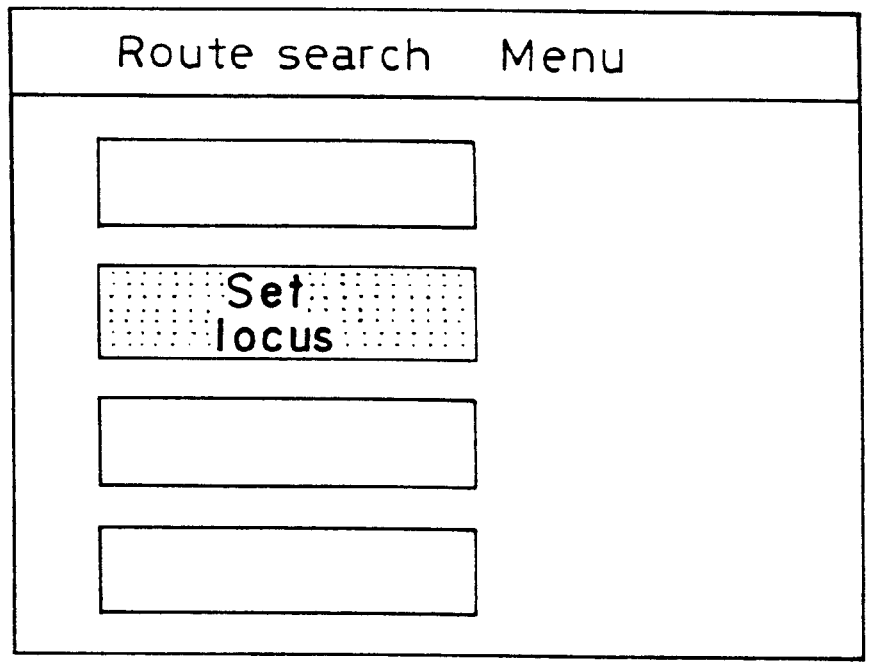
FIGS. 14(a) and 14(b) are diagrams of menu screens for registering user preferred road data.
Figure 14B:
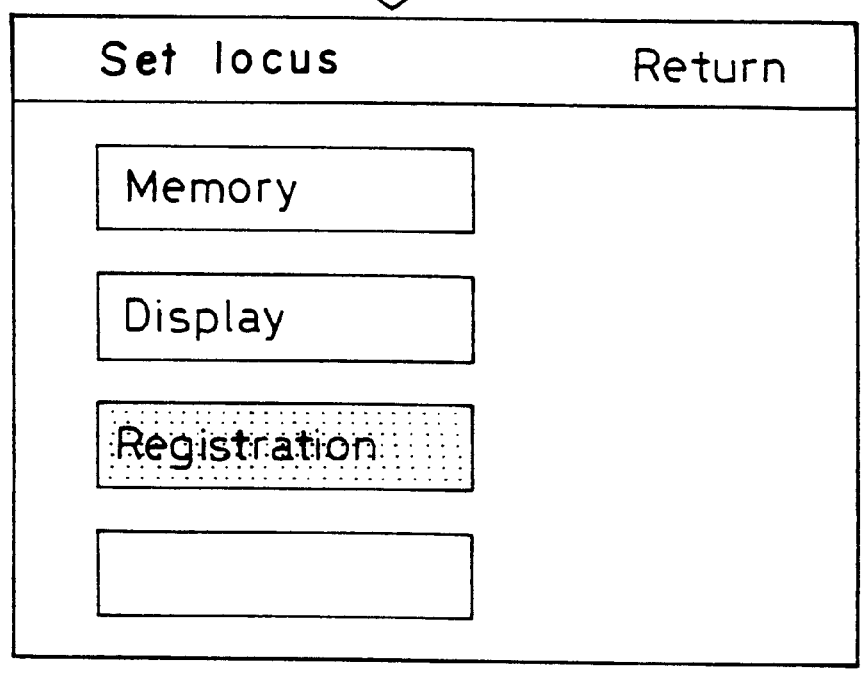
Figure 15:
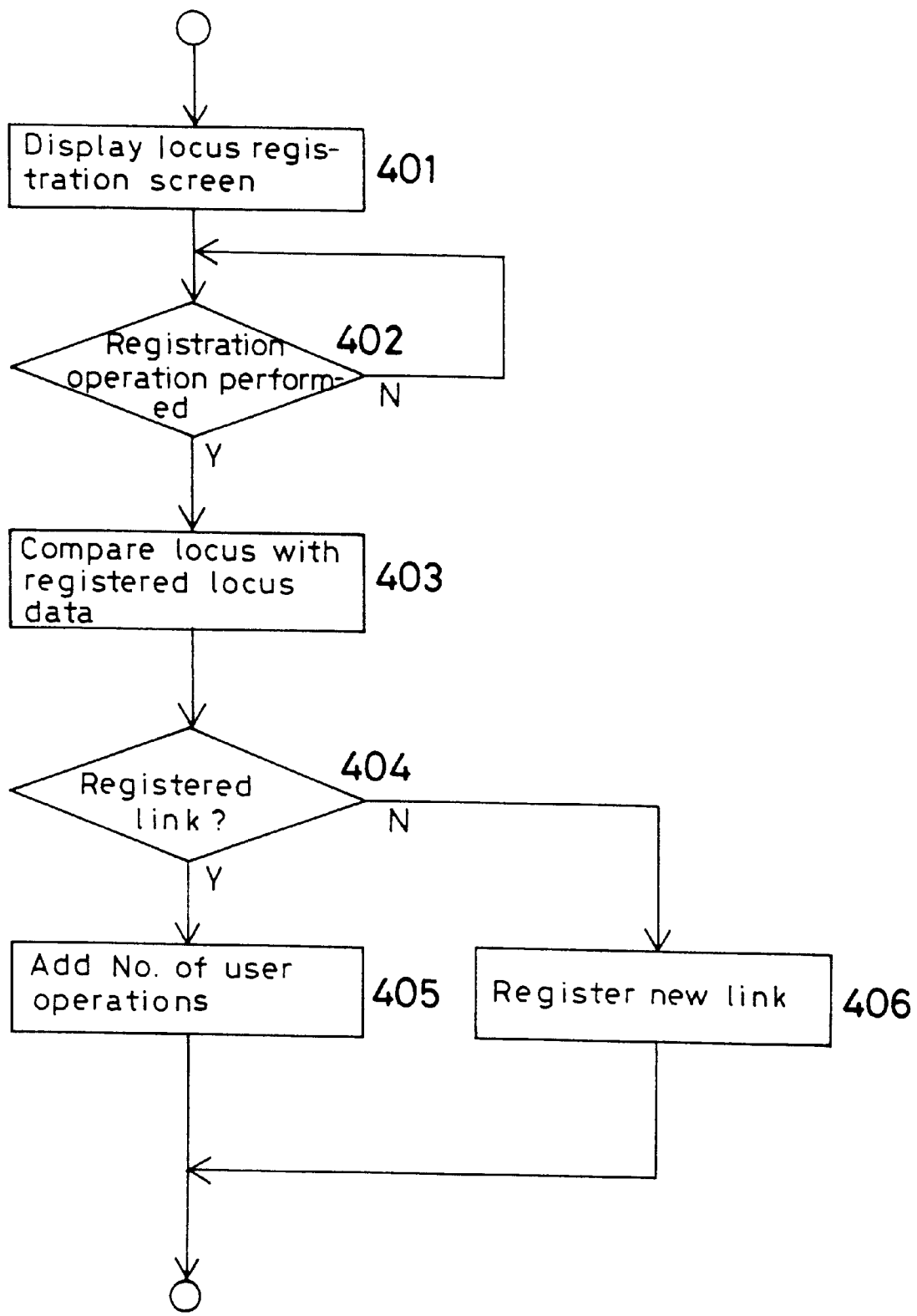
FIG. 15 is a flow chart of a procedure for registering user preferred road data.

A procedure for registration of route user preferred data by user operation is illustrated in FIGS. 14 and 15. This setting of registration of user preferred data by user operation is initially set up by menu processing step 302 in FIG. 13. That is when the user preferences selection of FIG. 14(*a*) is selected in step 302, pop-up screens such as the screen of FIG. 14(*b*) are display at appropriate points during route guidance. The pop-up screen includes items such as memory, display and registration selections. When registration is selected, the corresponding user preferred data is registered.

In FIG. 15 when the registration operation is performed by the user in steps 401 and 402 by screen display selection, the user preferred data (node, link or intersection) to be registered is compared with the registered data, step 403, to determine if the user preferred data is already registered. If, for example, a link is already registered (step 404), the data item of number of registrations by user operation is incremented (step 405). If it is not previously registered, a user preferred data item such as a link is generated and registered in step 406.

Figures 17A, 17B:
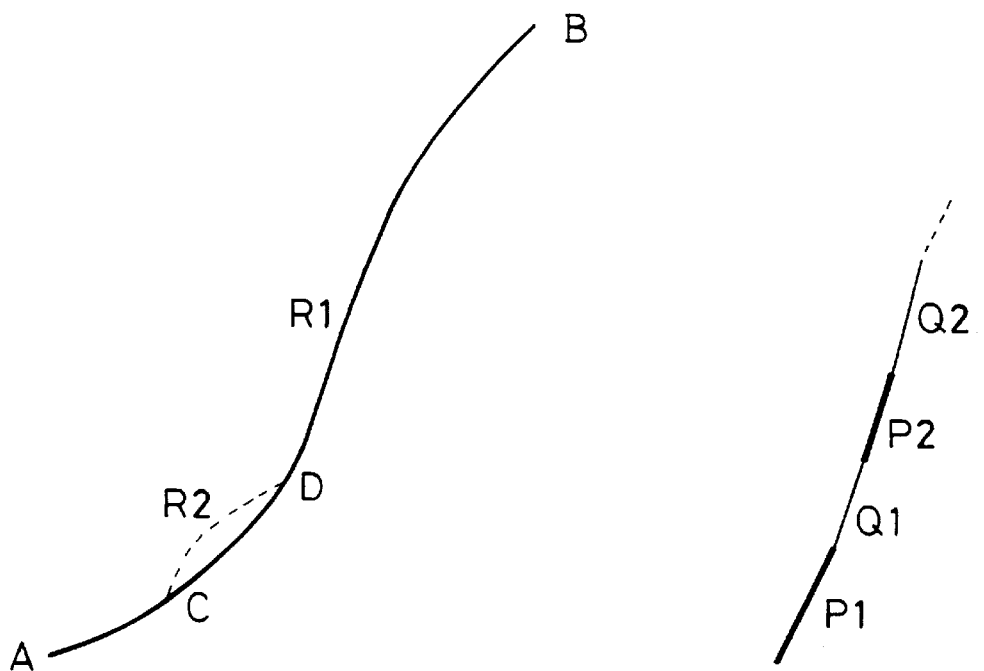
FIGS. 17(a) and 17(b) are maps of routes determined by searching.

In a still further modified program for route searching and guidance using CD-ROM data and user preferred data as illustrated in FIG. 16, the destination is set in step 501 and route search and guidance is performed by CPU 40 of the central processing unprocessing unit 4. In step 502, CD-ROM data are read and route searching is performed using the CD-ROM data. For example in FIG. 17(*a*) a route R1 from point A to point B is determined by the search. A search using user preferred data may then be conducted on a portion of the route RI between point C and point D by selecting a user preferred data search in step 503 and setting a destination for this search at point D in step 504. Then is step 505 the departure point node (point C) is set as the search starting point. User preferred data is read and vicinity link searching is performed between points C and D by steps 506 and 507. When the searching based on the user preferred data is completed and a route R2 is determined, guidance is performed along the modified route during steps 508–511. In step 508 the present position is determined and user preferred data is registered in step 509. Step 510 ends guidance when the destination is reached and step 511 outputs the guidance information for the driver.

In the above procedure of FIG. 16, a portion of the searched route from CD-ROM data is replaced with the route searched from user preferred data. Alternatively, searching from CD-ROM data and searching from user preferred data may be alternated in time; for example in FIG. 17(*b*), CD-ROM searching (P1, P2) may be alternated with user preferred data searching (Q1, Q2) such as in the order P1→Q1→P2→Q2. Also searching may be made solely of user preferred data.

Figure 18:
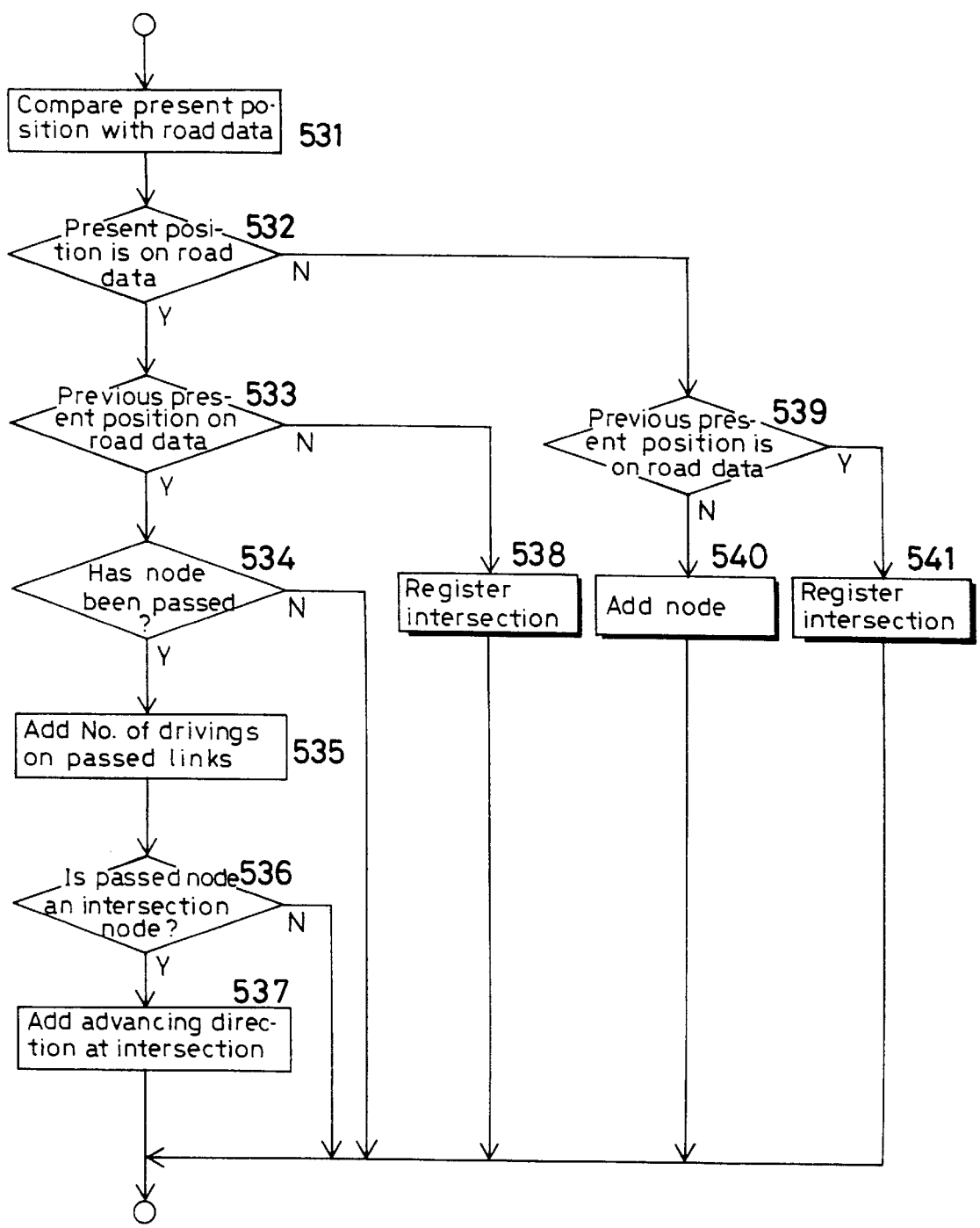
FIG. 18 is a flow chart of another procedure for registering user preferred data.

Updating of the user preferred data of FIGS. 4, 5 and 6 can be performed by the procedure of FIG. 18. In step 531, the present position is recognized and compared with the road data registered as user preferred data or with the fixed road data in CD-ROM. Comparison of the present position with the coordinates of node data determines whether the vehicle is currently driving along a road in the determined guidance route, step 532. If the present position is along the road data, it is determined whether the previous present position (previous node) is also on the determined route, step 533. If the previous present position is also on the route and if a node has just been passed though, step 534, the number of trips on the link just passed through (a section between the previous node and the node just passed through) is incremented in step 535. If the passed node is found to be an intersection node in step 536, the number of advancements to the current exit link from the entering link of the intersection in the intersection data is incremented, step 537. Back in step 533 if the previous present position is not on a registered road in the road data of the guidance route, then the vehicle has entered a registered node from a non-registered road. This node is then registered as an intersection in step 538. Back in step 532 if the present position is not on a registered road, it is then determined in step 539 whether the previous present position was on a registered road in the route data. If the previous present position was also not on a registered road, then the vehicle is being driven on a new road and a user preferred node is then added and registered to the user preferred data in step 540. In step 539 if the previous present position is found to be on a registered road, then the vehicle has branched from a registered node to a non-registered road and the registered node is registered as an intersection in step 541.

Figure 19:
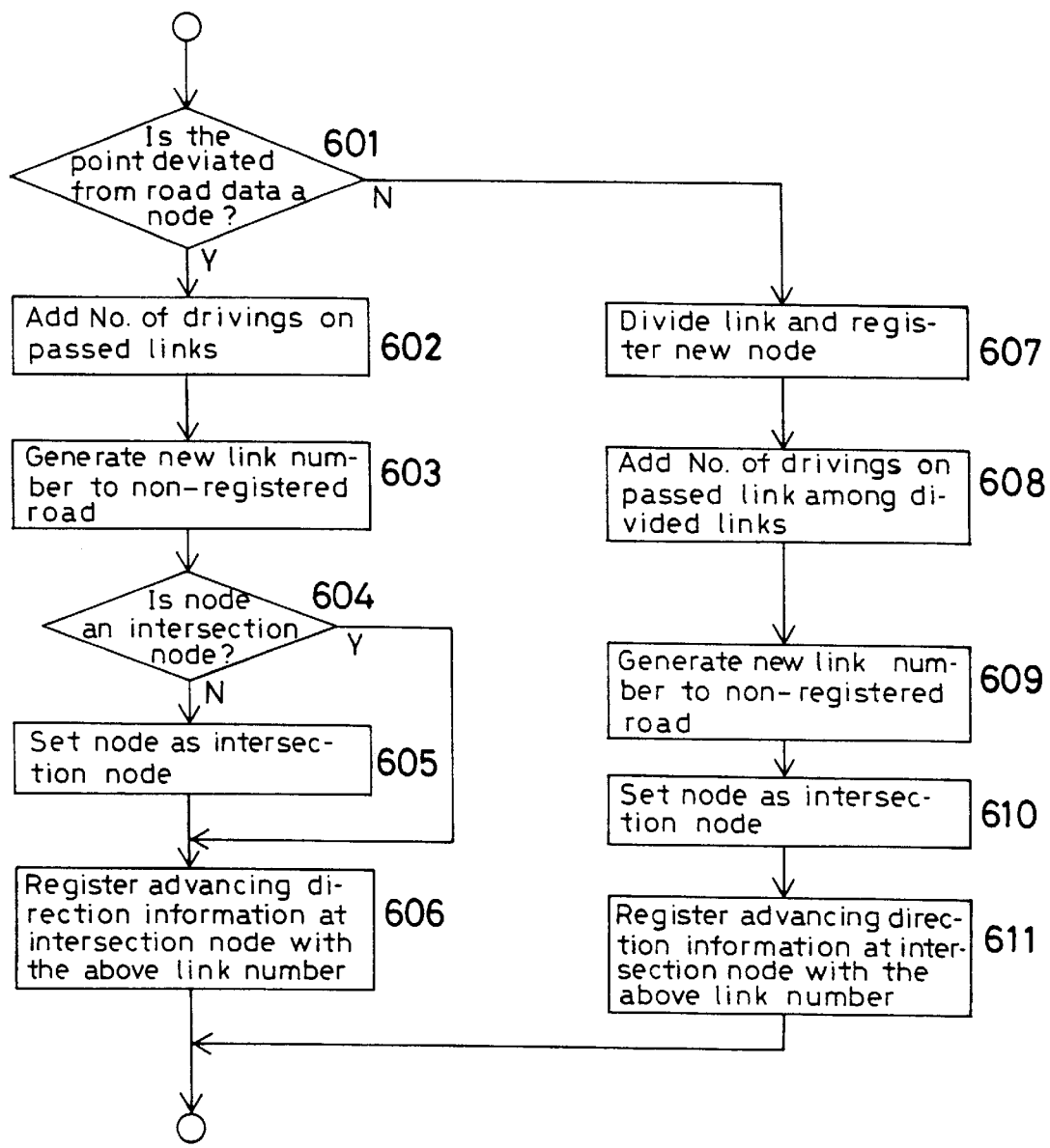
FIG. 19 is a flow chart of a procedure for registering user preferred data when a vehicle deviates from a registered road.
Figure 20A:
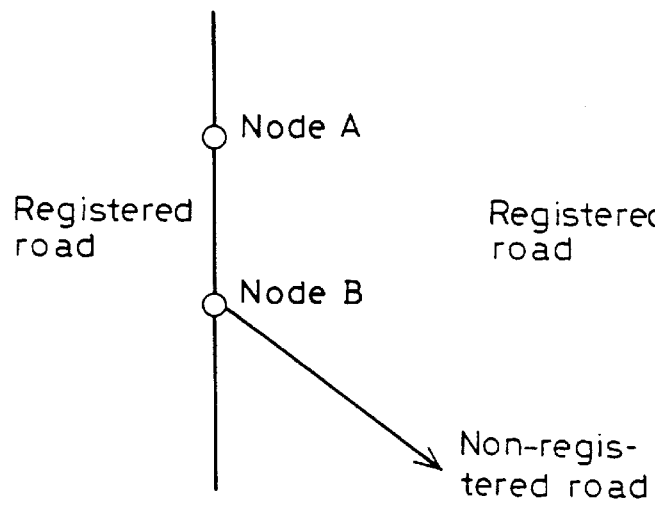
FIGS. 20(a) and 20(b) are maps of routes illustrating registration of user preferred data in accordance with the procedure of FIG. 19.
Figure 20B:
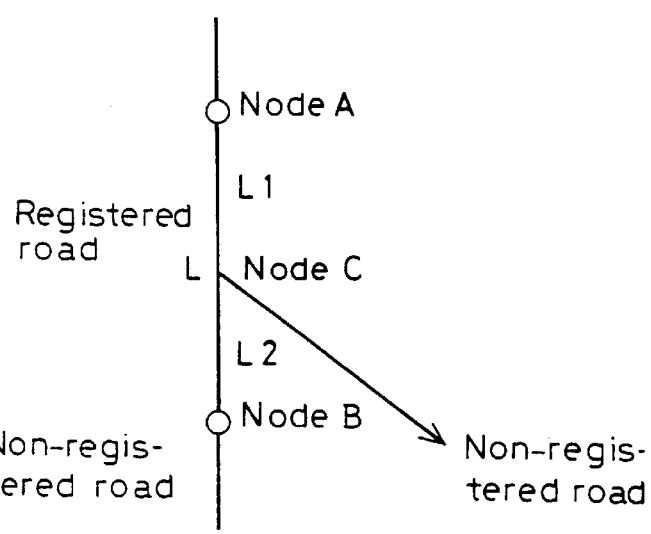

Intersection registration, such as in step 541, is illustrated by the procedure of FIG. 19. In step 601 it is determined whether the point where the vehicle is diverted from the registered road is a registered node or not. If the deviation point is a registered node, such as node B in FIG. 20(*a*), the number of trips on the link between nodes A and B is incremented in step 602, and a link number is generated for the new non-registered road in step 603. If the node B where the vehicle diverted from the registered road is found not to be registered as an intersection node in step 604, then the node is set as an intersection node in step 605. At the same time, advancing direction information (FIG. 6) at the intersection node is registered in step 606 with the link number generated in step 603. Back in step 601 if the point where the vehicle is diverted is found not to be a node, then in step 607 the registered link such as link L between the nodes A and B in FIG. 20(*b*) is divided into two links such as links L1 and L2 and a user preferred node C is registered. Each of the divided links take the number of trips previously recorded for the link before division. In step 608, the number of trips on the traversed link among the divided links is incremented. A user preferred link number is generated for the non-registered road in step 609, and the node C is set as an intersection node in step 610 with corresponding advancing direction information being registered in step 611, such as the entry and exit link data of FIG. 6.

When a vehicle returns to a registered road or node from a previously non-registered road such as step 538 in FIG. 18, the procedure of FIG. 21 is used. In step 701, it is determined if the point where the vehicle has entered the registered road is a registered node. If the joining point is a node as shown in FIG. 22(*a*), a new link number is generated in step 702 for the non-registered road joining the node. If the node is found in step 703 not to be registered as an intersection, the node is set as an intersection in step 704. Entry link information is registered in intersection data with the newly generated link number in step 705. Back in step 701 if the joining point is found not to be a node, the link such as link L in FIG. 22(*b*) containing the joining point is divided into two links such as links L1 and L2 and a new node is registered, step 706. The divided links take the number of trips recorded for the link which was divided. Among the divided links, the number of trips on the traversed link is incremented in step 707. In step 708, a user preferred link number is generated for the non-registered road, and in step 709 the user preferred node is set as an intersection node. Entry link information for the intersection node is registered at step 710.

Figure 23:
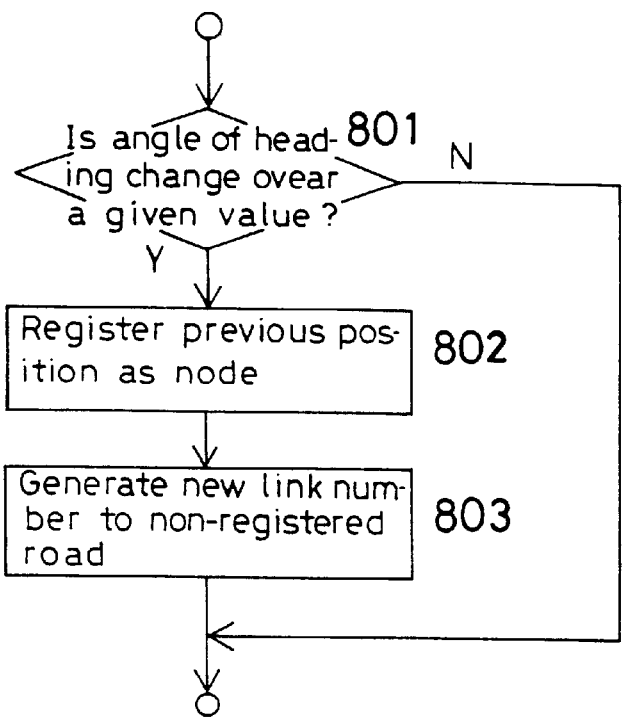
FIG. 23 is a flow chart of still another procedure for registering user preferred node data while traveling along a non-registered road.
Figure 24:
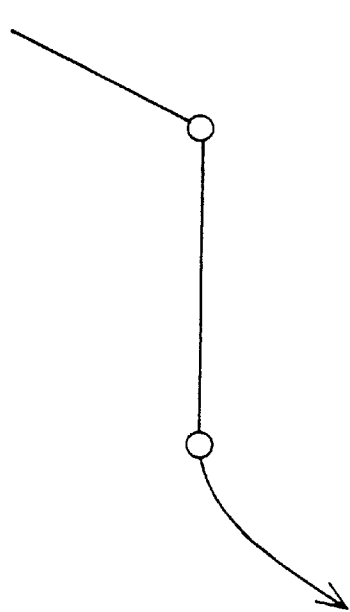
FIGS. 24(a) and 24(b) are maps of routes illustrating registration of user preferred node data in accordance with the procedure of FIG. 23.
Figure 24:

Adding a user preferred node while driving along a new road is performed by the procedure of FIG. 23. In step 801, it is determined if the direction of movement of the vehicle has changed by more than a predetermined value. If true then in step 802, the previous position where the angle of heading has changed over a given value is registered as a node as shown in FIG. 24(a), and a new user preferred link number is generated for a road not registered (step 803). On the other hand, as shown in FIG. 24(b), in case the angle of heading change is small, there is no need to add a node even when it is at long distance from the previous node, and the processing to add node is not performed.

Figure 25:
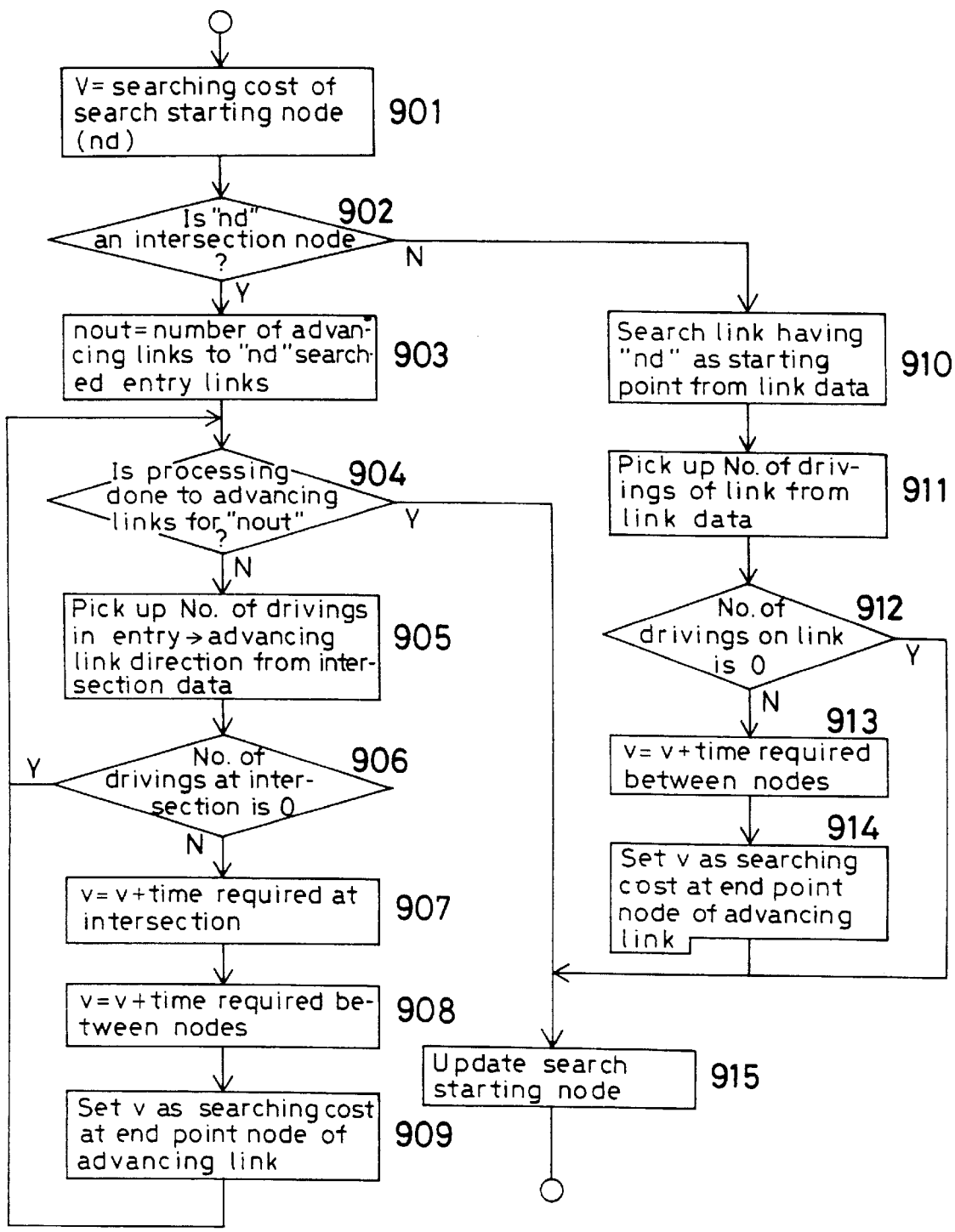
FIG. 25 is a flow chart of a procedure for searching vicinity link data.

Vicinity searching with the travel time as searching cost (preference) is illustrated in the procedure of FIG. 25. First, a variable "v" is set for calculation of the travel time for each exit link from the search starting node "nd", step 901. In step 902, it is determined whether the node "nd" is an intersection node, and if true, the number of links to be searched is set equal to "nout", the number of links exiting the node, step 903. Step 904 determines whether or not processing of the links "nout" is completed, and if not, the number of advancements from the intersection into the exit link under consideration is retrieved in step 905 from the intersection data. If this retrieved number of advancements is found to be greater than zero in step 906, the time required to pass through the intersection (average transit time) is added to the variable "v" in step 907. Further in step 908, the time required to traverse the exit link (a value obtained by dividing the length of the link by the average vehicle speed) is also added to "v". The value "v" computed by steps 905, 907 and 908 is then set in step 909 as the link searching cost in the end node of the exit link under consideration. The processing of the exit links "nout" continues until all the exit links from the intersection have been considered. If the number of trips entering an exit link is found to be zero (0) in step 906, searching is not performed on that link because there is a possibility of no entry. Back in step 902 in the case the node "nd" is not an intersection node, the link data is searched to find a link having the node "nd" as the starting point in step 910, and the number of trips on the found link is retrieved in step 911. If the number of trips along the link is found not to be zero (0) in step 912, the time for passing between the nodes is added to the variable "v" in step 913 and this sum "v" is set as the searching cost in step 914. In case the number of trips along the link is zero (0) in step 912, no searching is performed because there is the possibility of one-way traffic. When the searching is completed, the search starting node is updated in step 915. In this case, the node with the lowest cost among the nodes in the searching is selected, and processing is performed until the destination node is reached. By this processing, the route with the shortest time required is searched.

In the link data, the number of registrations by user operation is set. By decreasing the time required between nodes corresponding to the number of user operations, it is possible to perform route searching by reflecting the preference of the user.

What is claimed is:

1. A navigation system for vehicles, comprising:
   present position detecting means for detecting the present position of a vehicle;
   input means for inputting for a destination;
   information storage means for storing map data;
   locus data accumulating means for accumulating locus data for locus traveled by a vehicle based on coordinate information for the present position detected by said present position detecting means;
   route calculating means for calculating a route to the destination based on the map data stored in said information storage means and the locus data accumulated by said locus data accumulating means;
   route information storage means for storing the route calculated by said route calculating means; and
   guiding means for providing route guidance based on the route stored in said route information storage means.

2. A navigation system for vehicles, comprising:
   present position detecting means for detecting the present position of a vehicle;
   input means for inputting a destination
   information storage means for storing map data;
   locus data accumulating means for accumulating locus data for locus traveled by the vehicle based on coordinate information for the present position detected by said present position detecting means;
   route calculating means for calculating a route to the destination based on preset searching costs, said route calculating means including:
      first route calculating means for calculating a first route based on the map data stored in said information storage means;
      second route calculating means for calculating a second route based on the locus data accumulated by said locus data accumulating means; and
   comparison means for comparing the first route calculated by said first route calculating means with the second route calculated by said second route calculating means, and wherein:
   said route calculating means calculates a third route based on results of the comparison made by said comparison means.

3. A navigation system for vehicles according to claim 2, wherein said route calculating means corrects a preference coefficient based on the result of comparison by said comparison means, and a route is calculated according to the corrected preference coefficient.

4. A navigation system for vehicles according to claim 1, wherein said route calculating means searches a route requiring the shortest time to reach the destination based on the time required for passing intersections stored in intersection data.

5. A navigation system for vehicles according to claim 1, wherein said route calculating means searches a route requiring the shortest time to reach the destination based on the time required to drive a distance between nodes where the vehicle has been driven in the past.

6. A navigation system for vehicles according to claim 1, wherein the locus data is data for locus registered by a command from outside.

7. A navigation system for vehicles according to claim 1, wherein the locus data for locus traveled by the vehicle is registered by a command from outside and the locus data thus registered is displayed and output.

8. A navigation system for vehicles, comprising:

present position detecting means for detecting the present position of a vehicle;

input means for inputting a destination;

information storage means for storing map data;

locus data accumulating means for accumulating locus data for locus traveled by the vehicle based on the information of the present position detected by said present position detecting means;

route calculating means for calculating a route to the destination based on the map data;

route information storage means for storing a route calculated by said route calculating means; and guiding means for providing route guidance based on the route stored in said route information storage means;

wherein:

said locus data accumulating means registers locus according to a command from outside, corrects searching cost through comparison of the locus data and the map data, and calculates a route based on the corrected searching cost.

9. A navigation system for vehicles, comprising:

present position detecting means for detecting the present position of a vehicle;

input means for inputting a destination;

information storage means for storing map data;

locus data accumulating means for accumulating locus data for the locus traveled by the vehicle based on the present position detected by said present position detecting means;

route calculating means for calculating a route to the destination based on the map data;

route information storage means for storing a route calculated by said route calculating means; and guiding means for providing route guidance based on the route stored in said route information storage means, wherein:

said locus data accumulating means registers a number of registrations of the locus by a command from outside to said locus data accumulating means, and said route calculating means calculates a route using said locus data according to the number of locus registrations.

10. A navigation system for vehicles according to claim 9, wherein the number of registrations of the locus by a command from outside is registered for data of each link connecting node.

11. A navigation system for vehicles according to claim 9, wherein said locus data comprises node data added when an angle of heading change is larger than a given value, link data connecting between nodes and generated and registered when nodes are added and including data such as length, number of registrations, and average vehicle speed data, and intersection data having data such as number of advancements to each exit link to entry link data and average transit time.

12. A storage medium for a navigation system for vehicles, which contains a program which comprises the steps of:

detecting the present position of a vehicle;

storing map data;

inputting a destination;

accumulating locus data for the locus traveled by the vehicle based on the detected present position;

comparing the accumulated locus data with the map data;

correcting searching cost based on results of the comparison of the locus data with the map data; and calculating a route to the destination by referring to the corrected searching cost.

13. A storage medium for a navigation system for vehicles, containing a program which comprises the steps of:

detecting present position of a vehicle;

inputting a destination;

storing map data;

accumulating locus data for locus traveled by the vehicle based on the detected present position;

calculating a first route based on the map data;

calculating a second route based on the accumulated locus data;

comparing the first route with the second route;

calculating a third route based on the result of the comparison in the comparing step.

14. A storage medium for a navigation system for vehicles containing a program which comprises the steps of:

detecting the present position of a vehicle;

inputting a destination;

storing a map data accumulating locus data for a locus traveled by the vehicle based on the detected present position;

registering the locus based on a command from outside;

correcting the relative searching cost by comparison of the locus data with the map data;

calculating a route based on the corrected searching cost;

storing the calculated route; and providing route guidance based on the stored route.

15. A storage medium for a navigation system for vehicles, which contains a program comprising the steps of:

detecting present position of a vehicle;

inputting a destination;

storing map data;

accumulating locus data for a locus traveled by the vehicle based on the detected present position;

registering and accumulating a number of registrations of locus based on a command from outside;

calculating a route to the destination using the registered locus according to the number of registrations of the locus;

storing the calculated route; and providing route guidance based on the stored route.

16. A navigation system for vehicles, comprising:

present position detecting means for detecting the present position of a vehicle;

input means for inputting a destination;

information storage means for storing map data;

locus data accumulating means for accumulating locus data for a locus traveled by the vehicle based on the detected present position;

route calculating means for calculating a route to the destination;

route information storage means for storing the route calculated by said route calculating means; and guiding means for providing route guidance based on the route stored in said route information storage means;

wherein:

said route calculating means comprises comparison means for comparing the locus data accumulated by said locus data accumulating means and said map data and means for correcting searching cost based on the result of comparison obtained by said comparison means, and calculates the route by referring to the corrected searching cost.

17. A storage medium for a navigation system for vehicles, which contains a program comprising the steps of:

detecting present position of a vehicle;

inputting a destination;

storing map data;

accumulating locus data for a traveled locus based on the detected present position;

calculating a route to the destination based on the stored map data and the accumulated locus data;

storing the calculated route; and providing route guidance based on the stored route.

18. A navigation system according to claim 1, further comprising:

judging means for judging whether or not the vehicle is currently driving along a road in the calculated route based on the detected present position; and wherein, when the vehicle is judged not to be driving along a road in the calculated route, said locus data accumulating means accumulates new locus data based on the detected present position.

* * * * *